P. O'THAYNE.

Improvement in Starching-Machines.

No. 5,031. Reissued Aug 13, 1872.

Chas H Smith
Harold Serell
Witnesses.

INVENTOR
Patrick O'Thayne,
By Lemuel W. Serell
ATTY.

AM. PHOTO-LITHOGRAPHIC CO. N.Y. (OSBORNE'S PROCESS.)

UNITED STATES PATENT OFFICE.

PATRICK O'THAYNE, OF NEW YORK, N. Y., ASSIGNOR OF ONE-FOURTH INTEREST TO CALVIN WILLARD.

IMPROVEMENT IN STARCHING-MACHINES.

Specification forming part of Letters Patent No. 124,969, dated March 26, 1872; reissue No. 5,031, dated August 13, 1872.

Specification of Improvement in Starching-Machines, invented by PATRICK O'THAYNE, of the city and State of New York.

This invention is for rubbing in and equalizing the starch in muslins, cloths, and garments, and performing automatically and with rapidity an operation that has heretofore been performed by hand and by the expenditure of considerable time and manual labor.

In starching fabrics and garments by hand the starch has to be rubbed in and equalized and the surplus removed, and often portions of the fabric do not receive the proper amount of starch; hence the gloss is unequal, and the fabric lacking in uniformity of stiffness.

I make use of two rubbers pressed toward each other by a yielding pressure, and oscillated or reciprocated so that the fabric placed between such rubbers is subjected to a rubbing and squeezing operation similar to that employed in hand-starching, but the action is more uniform and rapid, so that the fabric, after being placed in starch and subjected to my machine, has the starch thoroughly incorporated with it, and any surplus starch pressed out.

Figure 1:
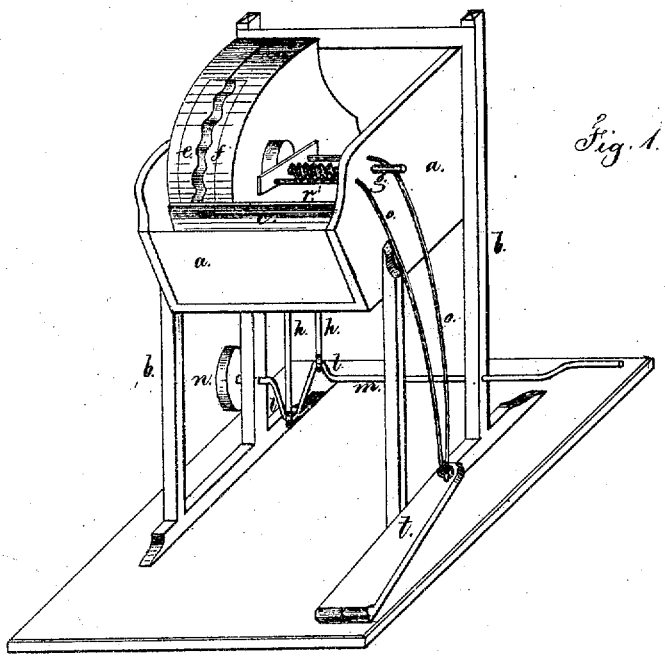
Figure 2:
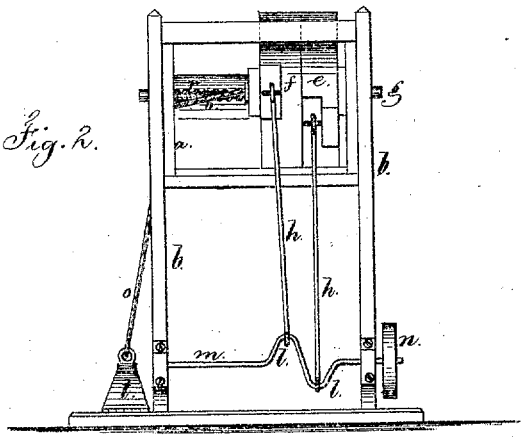
Figure 3:
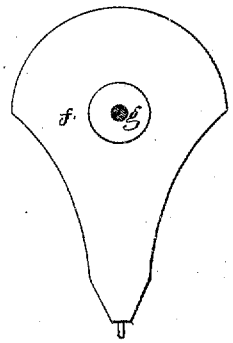

In the drawing, Figure 1 is a perspective view of the machine. Fig. 2 is an elevation at the rear end, and Fig. 3 is a side view, of one of the rubbers.

The box *a* is supported upon a suitable frame or legs, *b b*, and the box *a* is adapted to contain starch, and a separate receptacle for starch at *c* may also be provided. The rubbers *e f* are made with corrugations upon the contiguous surfaces. They may be worked horizontally and oscillated or reciprocated, but I have represented said rubbers as mounted upon a shaft, *g*, and connected at their rear ends with the pitmans or links *h* and cranks *l* upon the shaft *m*, so that, as said shaft *m* is revolved, the rubbing surfaces will be moved alternately in opposite directions. The shaft *m* may be revolved by a belt to the pulley *n*, or otherwise.

In order to separate the rubbers to give opportunity to introduce the fabric, I have shown the cords *o o* passing from a cross-bar at the side of the rubber *f* to the treadle *t*, and for applying a yielding pressure to the rubbers and the fabric placed between them I employ a spring shown at *r*.

It will be now understood that the fabric, article, or garment to be starched is dipped in starch, or the starch applied to it, and then the fabric or article placed between the rubbers *e* and *f*, the rubbers *f* being first drawn back to allow of its insertion. The yielding pressure and the reciprocation or oscillation of the rubbers rapidly incorporates the starch into and throughout the fabric with great uniformity, and surplus starch is pressed out, and the operation is completed by the removal of the article.

I do not limit myself to the shape or form of the rubbers or the materials composing the same, as these may be varied without changing the features of my invention.

I claim as my invention—

1. A starching-machine, composed of a pair of rubbers, between which the article to be starched is placed, and which are pressed toward each other by a yielding pressure, and reciprocated or oscillated substantially as set forth.

2. A starching-machine, composed of a pair of rubbers having corrugations on the contiguous faces, and swinging upon an axis or shaft, in combination with mechanism for pressing the rubbers together, and cranks for moving the rubbing-surfaces in opposite directions, substantially as for the purposes set forth.

3. In a starching-machine, the combination of the following instrumentalities: two rubbers, reciprocating or oscillating cranks, a yielding pressure or spring, and a treadle, substantially as and for the purposes set forth.

Signed by me this 23d day of July, A. D. 1872.

P. O'THAYNE.

Witnesses:

GEO. T. PINCKNEY,

CHAS. H. SMITH.